United States Patent [19]
Bolesky

[11] 3,811,721
[45] May 21, 1974

[54] MOBILE BODY AND METHOD OF MAKING SAME

[75] Inventor: Richard C. Bolesky, Warsaw, Ind.

[73] Assignee: Uniroyal, Inc., New York, N.Y.

[22] Filed: June 1, 1972

[21] Appl. No.: 258,673

[52] U.S. Cl. ................... 296/28 R, 296/31 P, 52/64
[51] Int. Cl. ............................................ B62d 29/04
[58] Field of Search.... 296/28 R, 28 M, 31 R, 31 P; 52/64, 79, 309; 220/4 F

[56] References Cited
UNITED STATES PATENTS

| | | | |
|---|---|---|---|
| 3,565,480 | 2/1971 | McCollum et al. | 296/31 P |
| 3,022,105 | 2/1962 | Tjaarda | 296/28 R |
| 1,414,419 | 5/1922 | Kemp | 296/31 P |
| 1,441,509 | 1/1923 | Killion | 220/4 F |
| 1,443,688 | 1/1923 | Hurd | 220/4 F |
| 2,658,101 | 11/1953 | Coxe | 220/4 F |
| 3,070,399 | 12/1962 | Bartlett | 296/26 |
| 3,455,596 | 7/1969 | Krutzikowsky | 296/31 P |

Primary Examiner—David Schonberg
Assistant Examiner—John A. Pekar
Attorney, Agent, or Firm—Robert J. Patterson, Esq.

[57] ABSTRACT

A mobile body, especially a mobile travel trailer body, formed from a plurality of angled sections of thermoplastic sheet material water-tightly joined to one another along their edges. In a preferred embodiment, a mobile travel trailer body is formed from four such quarter sections, a four-sided portion of thermoplastic sheet material water-tightly closing each end of the hollow four-sided body. A novel method of making such a body is shown. The lower pair of quarter section members of the resulting body are typically secured to a rigid frame having a plurality of road-engaging wheels mounted thereon.

Another embodiment utilizes a pair of quarter section members cooperating with a conventional half section member for forming the body portion of the mobile trailer.

18 Claims, 10 Drawing Figures

MOBILE BODY AND METHOD OF MAKING SAME

BACKGROUND OF THE INVENTION

The invention relates to a mobile body, especially a mobile travel trailer body, and, more particularly, to a mobile travel trailer fabricated from four quarter section members of thermoplastic sheet material, all such quarter members preferably having been previously fabricated by a vacuum forming process in accordance with well-known techniques. The invention also relates to a novel method of making such a body.

As is well known in the art to which this invention relates, it is conventional practice to assemble the body portion of a mobile travel trailer from two half section members fabricated from a thermoplastic material. In such practice, each half section member includes an inner shell and an outer shell, the outer surface of the inner shell being bonded to the inner surface of the corresponding inner surface of the outer shell. The inner shell of each half section member may have integrally molded members projecting inwardly and spaced apart from the outer shell. The aforementioned inwardly projecting members may define a variety of interior furnishings, i.e., a seat, table, toilet or storage area. Both upper and lower half section members have outwardly extending flanges, suitably drilled to permit the two half section members to be bolted together during the assembly of the trailer.

Heretofore, these thermoplastic half section members have been formed by conventional means in molds. The typical mold for forming half section members thus far developed, however, could not be utilized for a variety of mobile trailer designs; a new mold was required for each half section member when it was desired to vary the length of the half section members or to substantially modify the configuration of a half section member.

Accordingly, it is a primary object of the present invention to provide a mobile body such as a mobile travel trailer body and a method of making same which will overcome the aforesaid disadvantages.

A further object of this invention is to provide a mobile travel trailer body or the like, which may be assembled from four quarter section members.

A still further object of this invention is to provide a mobile travel trailer body which is more economical, easier to manufacture, and simpler to assemble than conventional mobile travel trailer bodies.

Further objects and advantages of this invention will become apparent as the following description proceeds.

SUMMARY OF THE INVENTION

In its broader aspects, the invention is a hollow mobile body, especially a mobile travel trailer, formed from a plurality of open angle sections each of which is formed from a thermoplastic sheet material in a preceding operation. Each angle section has a length equal to that of the body, has generally flat sides merging integrally into one another at an angle at the bottom of the trough and has an integral triangular end-closing portion at each end. One generally flat side of each angle section forms a portion of one face (e.g., top, side or bottom) of the body and the other generally flat side thereof forms a portion of another face of the body. The angle sections are water-tightly joined to one another in parallel relationship along the edges of their generally flat sides to form a hollow body. A polygonal end portion also formed from a thermoplastic sheet material closes each end of the resulting body, this being accomplished by water-tightly joining the sides of the polygonal end portions to the free edges of the triangular end-closing portions of the angle sections.

In the preferred practice of the invention, four right-angled angle sections are employed and corresponding four-sided end portions are used to close the openings in the ends.

In another aspect, the invention is a method of making a hollow mobile body which typically comprises assembling a plurality of open angle sections formed from a thermoplastic sheet material, each of these sections having a length equal to that of the body, having sloping generally flat walls merging integrally at an angle at the bottom of the trough, and having at each end an integral triangular end-closing portion, so as to form a hollow open-ended structure, and closing the open ends of this structure. Assembly of the angle sections is carried out in such a way that they are water-tightly joined to one another along the free edges of their sloping sides. The opening in each end of the resulting hollow structure is closed with polygonal end portions which are also formed from thermoplastic sheet material and are so dimensioned as to enable water-tightly closing of these open ends. This is achieved by water-tightly joining the sides of the polygonal end portions to the free edges of the triangular end-closing portions of the angle sections from which the hollow tunnel-like assembly is made. The assembling of the angle sections and the end-closing steps need not take place in the sequence just given. For example, it is conceivable that the trough-like portions could be joined to the end-closing portions at the same time as they are joined to one another or even before they are joined to one another.

Any kind of hollow mobile body can be made in accordance with the invention. While the invention is particularly useful for mobile travel trailer bodies, it can be used in making other types of mobile bodies such as containers used for hauling freight on land, by water, or by air, bodies mounted on truck chassis, etc.

The invention in its preferred form is a generally rectangular mobile travel trailer body formed from four open angled quarter sections each of which is formed (in a previous operation) from a thermoplastic sheet material and has a length equal to that of the trailer body. One sloping side of each quarter section preferably constitutes approximately one-half of one face of the body and the other sloping side typically constitutes approximately one-half of another face of the body. Each of these quarter sections has an integral triangular end portion, usually in the form of a right triangle. The quarter sections are water-tightly joined to one another in any suitable manner along the edges of their sloping sides to form a generally rectangular body and a four-sided end portion of thermoplastic sheet material water-tightly closes each open end of the body, the periphery of these end portions being joined in any suitable way to the edges of the adjoining triangular end portions of the quarter sections.

The joining of the several portions of the body to one another can be accomplished in any suitable way. It is preferred to provide the edges of the open angle sections and the edges of the polygonal end portions with integral flange portions formed in any suitable way during the drawing and forming operation by which these elements were prepared, and to clamp the longitudinally extending flange portions of adjacent angle sections together water-tightly and the flange portions on the free edges of the triangular end-closing portions to cooperating flange portions on the sides of the polygonal end portions.

Any other means of joining which will give a water-tight and vibration-proof bond can be employed. Examples are systems based on organic solvent-containing adhesives and systems based on solvent welding of the adjacent plastic surfaces, which preferably are flanged. For example, a volatile organic solvent such as methyl ethyl ketone can be applied to the flanged thermoplastic surfaces to be joined after which the solventized surfaces are held together until the solvent diffuses or evaporates giving an integral bond.

The quarter sections need not necessarily be symmetrical. Thus, they can be made with one side wider than the other so that the resulting joint in the face of the resulting body is not at the median line. However, for aesthetic reasons it is usually preferred that the longitudinal joint in the top of the trailer body be at the midpoint.

In accordance with one embodiment of the present invention, there is provided a mobile trailer having a body portion which includes four quarter section members, each quarter section member having been previously formed from a thermoplastic material by a vacuum molding process. Prior to placing the thermoplastic material into the forming mold, various sheets may be placed on the surface of the thermoplastic material so as to form contoured areas for utility or support purposes in the completed quarter section member. Each completed quarter section member is secured to an adjacent quarter section member for defining a preferably rectangular body portion having a rectangular (usually square) hole at opposite axial ends thereof. The lower pair of quarter section members is secured to a conventional rigid frame which has a plurality of wheels mounted thereon. A cooperating rectangular end panel is secured to each quarter section member at opposite axial ends thereof so as to define a substantially rectangular internal chamber. In a second embodiment, two quarter section members providing the top and half sidewall or bottom and half sidewall are utilized in conjunction with a conventional half section member to form the body portion of the mobile travel trailer.

DETAILED DESCRIPTION OF PREFERRED EMBODIMENTS

Figures 1, 4, 5, 7:
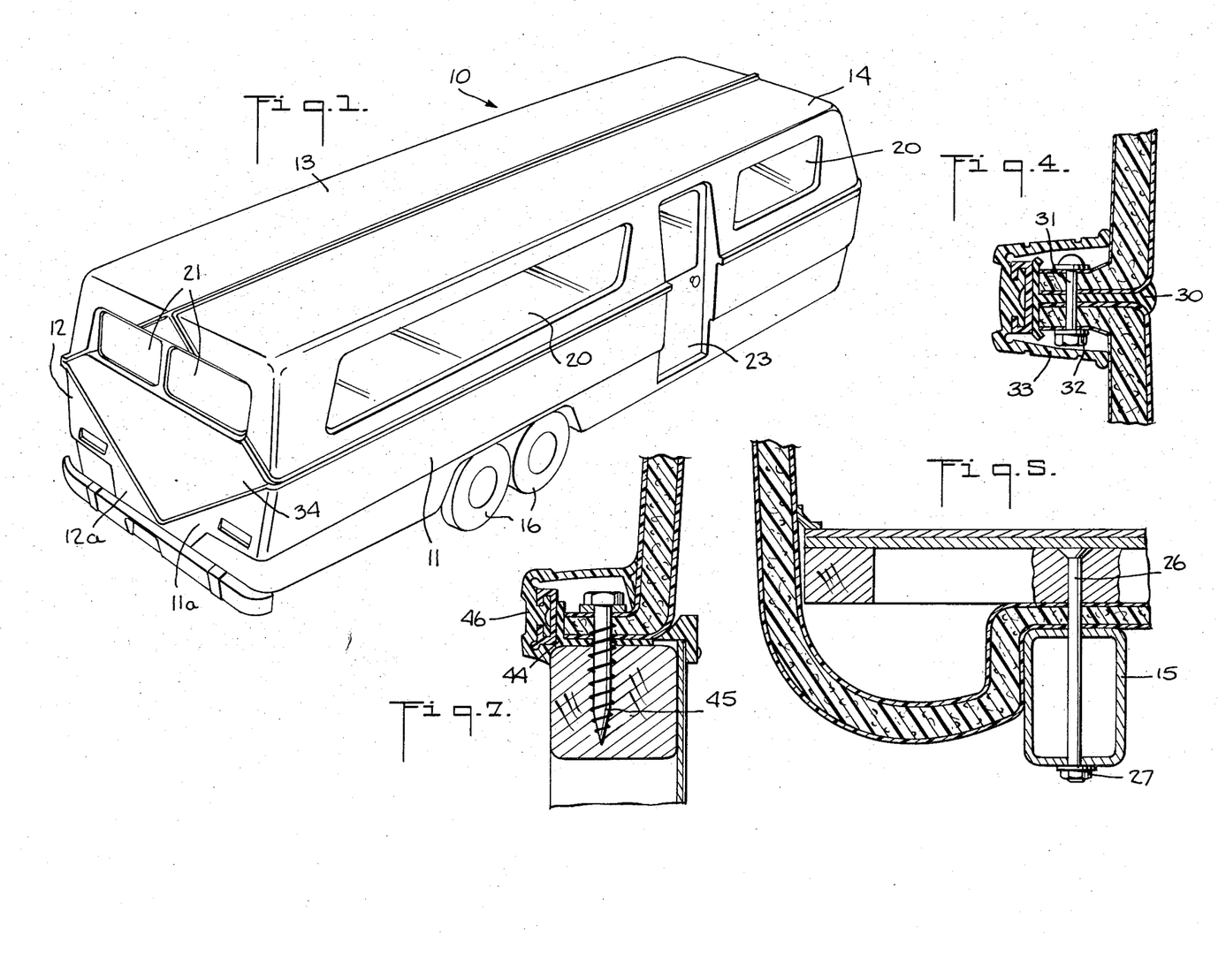
FIG. 1 is a perspective view of a mobile travel trailer of this invention shown assembled from four open angled quarter section members.
FIG. 4 is a fragmentary enlarged sectional view showing a preferred means for securing a quarter section member to an adjacent quarter section member.
FIG. 5 is a fragmentary enlarged sectional view showing one means for securing a quarter section member to the frame of the trailer.
FIG. 7 is a fragmentary enlarged sectional view showing one means for securing a quarter section member to an adjacent half section member.
Figures 2, 3:
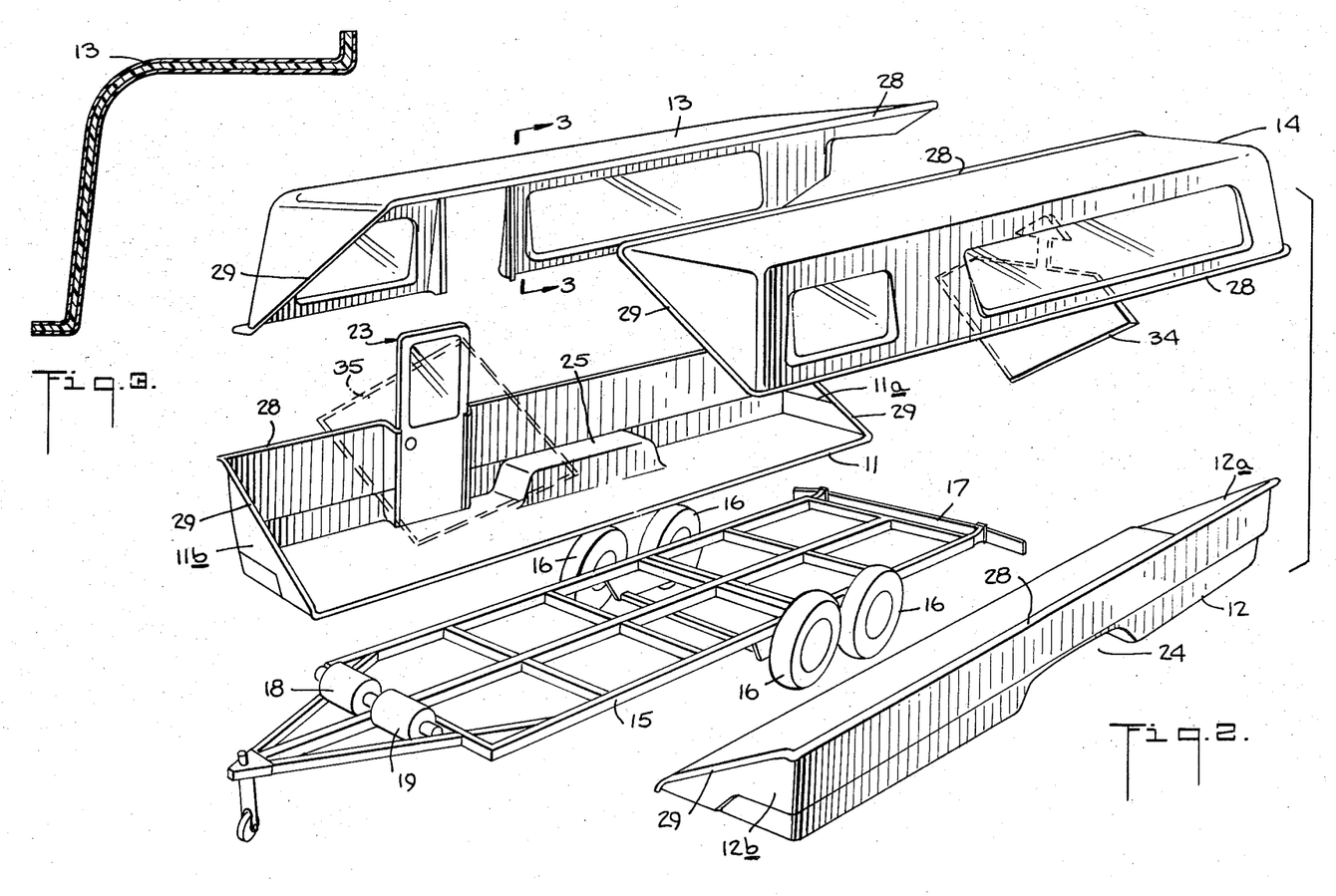
FIG. 2 is an exploded perspective view of the trailer shown in FIG. 1.
FIG. 3 is an enlarged sectional view taken on the line 3—3 of FIG. 2.

Referring now to the drawings in greater detail, a mobile trailer made in accordance with one embodiment of the present invention is illustrated in FIGS. 1–5. The mobile trailer, shown generally as 10, includes a substantially rectangular body portion having a pair of lower quarter section members 11 and 12, and a pair of upper quarter section members 13 and 14, each quarter section member having integral therewith a pair of triangular end walls. Lower quarter section members 11 and 12 are mounted on rigid frame 15 (usually made of metal such as steel) in such a way that rear end walls 11a and 12a are adjacent the rear bumper 17 of the frame while front end walls 11b and 12b of the lower quarter section members are adjacent water tanks 18 and 19 mounted on the rigid frame. As shown in FIG. 5, each of the lower quarter section members 11 and 12 is secured to rigid frame 15 by bolts 26 passing through the bottom floor-supporting portion of the respective quarter section member and frame, so as to threadedly engage nut 27. Rigid frame 15 has a plurality of wheels 16 rotatably mounted thereon, substantially rearwardly of the middle of frame 15, as shown in FIG. 2.

A plurality of substantially conventional window units 20 and 21 are installed in the side and rear portions, respectively, of upper quarter section members 13 and 14. The body portion of the trailer has a door 23 placed to most effectively suit the intended layout of the trailer. For purposes of illustration, the upper half of the doorway is shown as in the side of an upper quarter section member and the lower half of the door 23 is shown as in the side of the corresponding lower quarter section member.

The aforementioned quarter section members may have molded integrally therewith window recesses, window frames, surface designs, vents, door recesses, etc. Each of the lower quarter section members 11 and 12 is formed with recessed portions which form two wheel wells 24 and 25.

Each quarter section member has integral therewith a pair of outwardly directed flanges 28 along each side edge and a pair of outwardly directed flanges 29 along each end edge. These flanges are provided with spaced bolt holes intermediate their inner and outer peripheries extending completely therethrough. As shown in FIG. 4, adjacent quarter section members are secured to each other by interposing an elongated T-shaped member 30 (typically made of extruded aluminum or ABS plastic) between corresponding side edge flanges of adjacent quarter section members. The elongated T-shaped member 30 is provided with spaced bolt holes located intermediate its inner and outer peripheries so as to permit bolt means 31 to pass through the side edge flanges and the T-shaped member for threadedly engaging nut 32. An elongated cup-shaped member 33, typically a semi-rigid vinyl plastic extrusion, is mounted on T-shaped member 30, the member 33 dovetailing with member 30 and being secured thereto in any suitable way for improving the appearance of the joint and protecting bolt means 31 and nut 32 from corrosion. The secured quarter section members form a substantially rectangular body portion having a four-sided hole at opposite axial ends thereof. A pair of four-sided end panels 34 and 35 flanged at their edges may be secured in the same way as is described above (see FIG. 4) to each quarter section member along a respective side edge of each quarter section member at opposite axial ends thereof, thereby defining a substantially enclosed body portion having a rectangular internal chamber.

The structural rigidity of a mobile travel trailer body made as described above is significantly enhanced because of the use of the open angle elements, because those elements were formed and drawn from a single sheet of thermoplastic material, and because the elements of the body are joined together by flanges integral with each of the elements and securely joined together as by clamping. This enhancement of structural rigidity is especially attributable to the longitudinal flanged joints.

The joint assembly portrayed in FIG. 4 is most attractive both when viewed from the interior (because element 30 completely closes the opening) and when viewed from the exterior (because the joint is completely concealed by cap extrusion 33).

It will be obvious to one skilled in the art that any suitable thermoplastic sheet material may be used to form durable and substantially rigid quarter sections and the end closures for the mobile trailer and, furthermore, that integral ribs may be formed in the sheet material to provide additional bracing and render the structure of the trailer body even more rigid. No other bracing is required in order to maintain the contours of the trailer.

Figure 6:
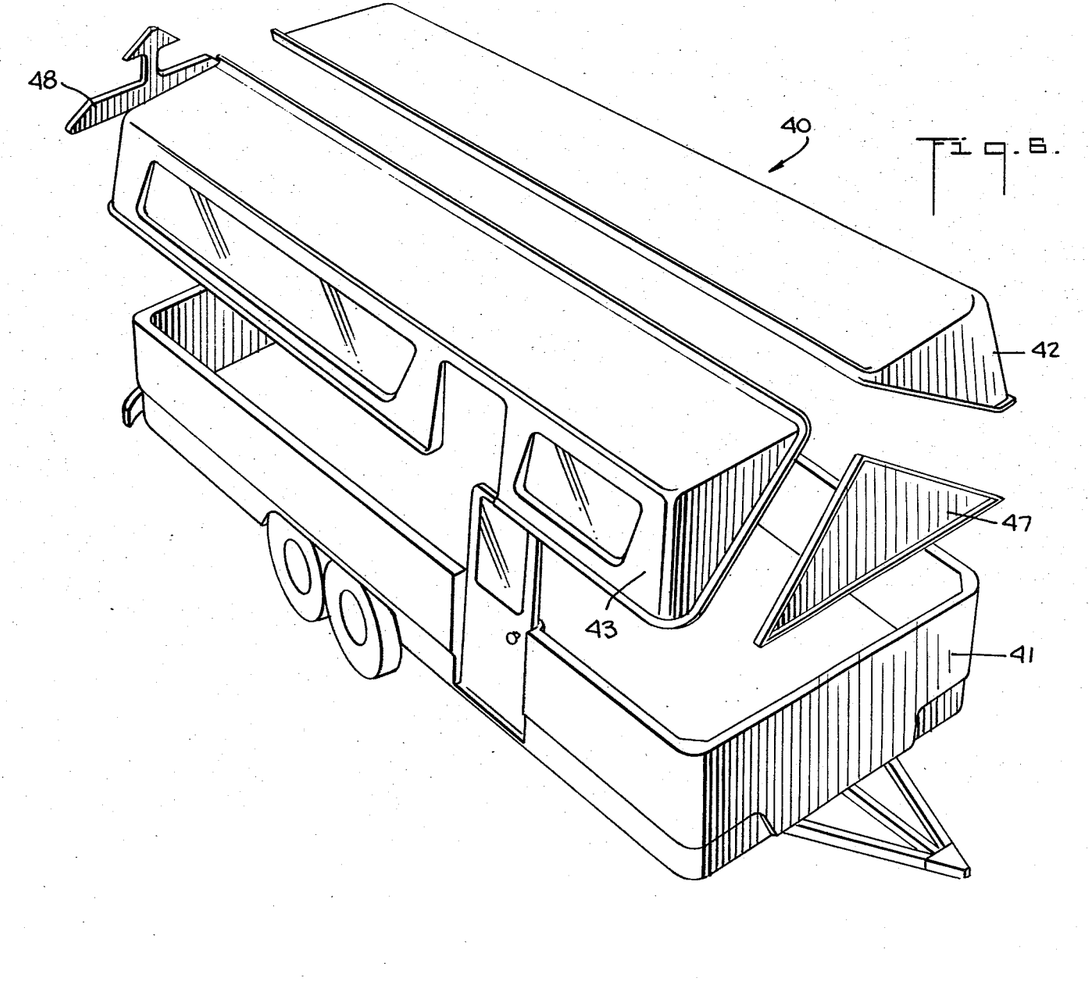
FIG. 6 is an exploded perspective view of another embodiment of this invention shown assembled from two quarter section members and a half section member.

Referring now to FIGS. 6 and 7, a mobile trailer made in accordance with another embodiment of the present invention is illustrated. This trailer, shown generally as 40, includes a substantially rectangular body portion including a lower half section member 41 and a pair of upper quarter section members 42 and 43 mounted thereon. The lower half section member 41 includes opposite, rectangular shaped side walls and opposite, rectangular shaped end walls. The bottom surface of the half section member is secured to rigid frame 15 in the same manner as was described above in connection with FIG. 5. The upper quarter section members preferably include cutouts for windows and a doorway. The half section member preferably includes cutouts for a doorway and wheel wells. As before, each quarter section member has outwardly directed integral flanges along all of its edges. The quarter section members 42 and 43 are secured to each other along adjacent side edge flanges in the manner described above, each quarter section member being secured to the half section member 41 along a respective corresponding side edge flange. An L-shaped member 44 (FIG. 7), having a plurality of spaced bolt holes intermediate its inner and outer peripheries is interposed between the side edge of the half section member and a corresponding side edge flange of the respective quarter section members. Screw means 45 passes through the side edge flanges and the L-shaped member 44 so as to threadedly engage the side edge portion of the half-section member. A cap member 46, typically a semi-rigid vinyl plastic extrusion, mounts over the joint member, member 46 being secured in position in any suitable way so as to provide an attractive cover for the joint and to protect screw means 45 from corrosion. The quarter section members cooperating with the half section member form a rectangular body portion having a triangular opening at opposite axial ends thereof. Integrally flanged triangular shaped end panels 47 and 48 are secured in the ways described above to both quarter section members and to the half section member along a respective side edge of each quarter section member and half section member at opposite axial ends.

By reference to the drawings, it will be seen that the present invention utilizes open angle sections each comprising a pair of integral longitudinally extending walls and further comprising at the opposite ends thereof a pair of triangular end walls each integral with and disposed in generally perpendicular relationship to both of the longitudinally extending walls. In the typical practice of the invention, as is shown in the drawings, the longitudinal walls of each angle section are disposed in generally perpendicular relationship to one another. In the embodiment of FIGS. 1-2 four quarter sections are disposed in such angular relationship to one another that two of the sections form the upper portion of the trailer body while the other two sections form the lower portion thereof, the uppermost longitudinal walls of the first two sections forming the roof of the trailer body, the lowermost longitudinal walls of the second two sections forming the floor of the trailer body, and the upright longitudinal walls of the two sections on each side forming the two side walls of the trailer body. In the embodiment of FIG. 6, the two quarter sections 42 and 43 are arranged in the same angular relationship with respect to one another as sections 13 and 14 of FIGS. 1-2 and are arranged in such angular relationship with respect to half section 41 that the side walls of the half section 41 and the upright longitudinal walls of the quarter sections 42 and 43 together form the side walls of the trailer body.

As indicated above, the aforementioned quarter section members may be formed from a thermoplastic material by a vacuum molding process. The vacuum forming mold is constructed in such a way that the mold is of the maximum length anticipated for any desired trailer body, shorter lengths being attained by blocking the mold with an appropriate insert. Additional inserts may be provided, within the mold, to form integrally in each quarter section member the heretofore described wheel wells, windows, doorways, ribs and vents.

The thermoplastic material used in the fabrication of the quarter section members and the half section member is preferably a copolymer of acrylonitrile-butadiene-styrene (ABS), exemplified by a laminated ABS material such as that known as "Royalex" (trademark) which has an expanded ABS core faced with non-expanded plastic skin sheets. The composition may be calendered into sheets ranging from 0.010 inch up to 0.040 inch thick, and built up by laminating such sheets under heat and pressure to any desired thickness. These laminated sheets may be utilizd in the above-described vacuum molding process to form the herein mentioned quarter section members and half section member. The four-sided shaped end panels used in the first embodiment herein described, as well as the triangular shaped end panels used in the second embodiment herein described, are preferably also fabricated from such laminated sheet ABS material.

Figures 8, 9, 10:
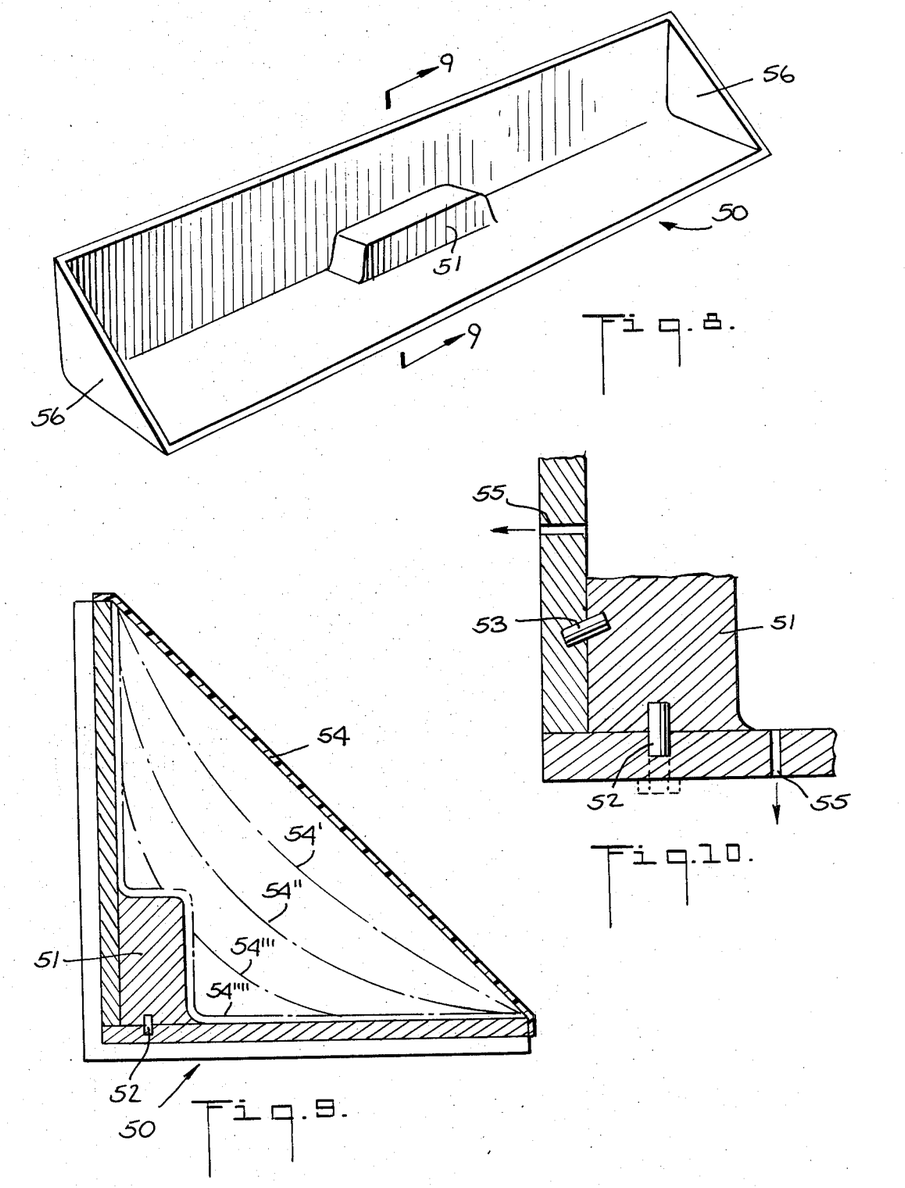
FIG. 8 is a perspective view of a form of mold which can be used advantageously for making the open quarter section members typically employed as the basic structural elements in mobile bodies of the present invention.
FIG. 9 is a section of the mold of FIG. 8 taken on the line 9—9 of FIG. 8.
FIG. 10 is an enlarged fragmentary sectional view showing further details of mold construction of FIG. 8.

FIGS. 8–10 show a preferred form of mold for forming the open quarter sections 11, 12, 13, 14, 42 and 43 referred to above, by a vacuum-forming technique. The entire mold is designated as 50. Within mold 50 is located member 51 which is in the form of a wheel well 24 or 25 and is held in proper placement within mold 50 by locating pin 52 or 53. Member 51 and the adjacent wall of mold 50 are provided with mated recesses or holes into which pin 52 or 53 fits. Alternatively, the recesses or holes in the wall of mold 50 can pass entirely through the mold wall so that pin 52 as shown in dotted lines in FIG. 10 can be a bolt or the like positioned and accessible from the exterior of the mold. If desired the locating pin can be so mounted as to secure forming member 51 to one of the vertical walls of the mold as shown by member 53 in FIG. 10.

A thermoplastic sheet 54, especially one having a cellular core and integrally bonded non-cellular facing sheets, such as described in U.S. Pat. Nos. 3,206,354 and 3,356,560, is heated to a temperature at which it becomes formable by vacuum drawing. The heated sheet 54 is positioned on the open face of mold 50 forming an air-tight seal with the peripheral edges of the mold face as shown in FIG. 9. If desired, the sheet 54 may be tightly clamped or framed at its edges. Air is then evacuated from the interior of the mold (by obvious means, not completely shown) through suitably located holes, typified by holes 55 in FIG. 10, in the walls of the mold whereupon sheet 54 is progressively forced down into the mold, successively taking the positions indicated by dotted lines 54', 54'', 54''' and finally taking the position indicated by dotted line 54'''', as shown in FIG. 9.

Integral right-angled flanges are formed at the margins of the drawn sheet by the edges of the walls of the mold, as indicated in FIG. 9. Upon completion of the drawing step, the vacuum is maintained and the formed shape is allowed to cool down to a temperature at which it retains its shape so that it can be removed, this cooling being accelerated, if desired, by passing a cooling medium over the formed shape. The flanges of the formed shape can be narrowed somewhat by trimming them.

The mold 50 can be readily adjusted in any obvious way so as to make quarter sections of any desired length. Wheel well-forming member 51 can be moved to any desired location, and can be removed altogether when formation of wheel wells is not desired. When it is removed, it is of course necessary to insert suitable plugs in the holes provided in the mold wall for pins 52 and 53 in order to provide a smooth flat surface for the parts being vacuum formed in the mold.

Although the preferred form of thermoplastic sheet from which the trailer parts are formed is a laminated, cellular cored sheet having a core of closed-cell expanded ABS plastic material and protective non-expanded facing sheets laminated thereto, such as is shown in U.S. Pat. Nos. 3,206,354 and 3,356,560, thermoplastic sheets of a non-cellular nature and sheets of non-laminated type are equally suitable for use in the invention, examples being the thermoplastic sheet materials described in U.S. Pat. Nos. 2,681,898; 2,698,313 and 3,018,268.

Because the curable skin shown in U.S. Pat No. 3,206,354 is particularly resistant to weathering effects (outdoor aging degradation), when a sheet as described in that patent is used, if only one exterior surface is composed of the curable skin, that surface should be the exterior surface in the final formed product. Similarly, U.S. Pat. No. 3,356,560 describes a sheet in which one surface layer is especially well suited to lend interior decorative effects; accordingly, when the laminated sheet of U.S. Pat. No. 3,356,560 is used in the practice of the invention the interior surface should be the side or surface made from the composition which lends itself to decorative effects. If the sheets used are composed of a single composition, such as any of those shown in U.S. Pat. Nos. 2,681,898; 2,698,313 or 3,018,268 no particular side would be preferred as the exterior side or as the interior side.

From the foregoing description it will be seen that the present invention provides an unusually advantageous trailer body construction and method of assembly thereof. The above-described mold used to form the quarter section members is extremely versatile. Since the mold length may be varied, as by utilizing movable end wall inserts, one mold may be used for all the quarter section members in the body portion of a wide variety of trailers by appropriate location of one end wall insert. Thus one mold can produce a substantial variety of quarter section members. Four such vacuum molded quarter section members may be used to form the body portion of the trailer. The ABS laminated sheets used in the construction of the body portion may be obtained in a wide variety of colors and surface finishes. This material may be used for the exterior as well as the interior of the body portion, as it has excellent corrosion resistance. It also has good strength characteristics and is widely used to replace metal. Inasmuch as the body portion of the trailer is fabricated from the heretofore described laminated sheets of ABS material, the exterior color may be different from the interior color. The utilization of quarter section members fabricated from a laminated ABS material substantially simplifies manufacture and assembly of the herein-described mobile trailer, thereby providing for a substantially more economical trailer.

While particular embodiments of this invention have been shown and described, it will be obvious to those skilled in the art that various changes and modifications may be made without departing from this invention in its broader aspects, and it is, therefore, intended in the appended claims to cover all such changes and modifications as fall within the true spirit and scope of this invention.

Having thus described my invention, what I claim and desire to protect by letters patents is:

1. A hollow mobile body formed from a plurality of open angle sections, each of said angle sections being formed from a thermoplastic sheet material and having a length equal to that of the body, each angle section having generally flat sides merging into one another at an angle and having at each end an integral flat triangular end-closing portion, one generally flat side of each angle section forming a portion of one face of the body and the other generally flat side thereof forming a portion of another face of said body, said angle sections being water-tightly joined to one another in parallel relationship along the edges of their generally flat sides in such angular relationship that they form a hollow body having a polygonal cross section, and a polygonal end portion formed from a thermoplastic sheet material closing each end of said body, each of the sides of said polygonal end portions being water-tightly joined to the free edges of said triangular end-closing portions.

2. A body as defined in claim 1 wherein the edges of the sides of said angle sections and of the sides of said polygonal end portions are provided with integral flange portions at right angles to said sides and wherein the longitudinally extending flange portions on the edges of the sides of adjacent angle sections are clamped together water-tightly and the flange portions on the free edges of said triangular end-closing portions are clamped water-tightly to the flange portions on the sides of said polygonal end portions.

3. A generally rectangular hollow mobile trailer body formed from four open angle quarter sections, each of said quarter sections being formed from a thermoplastic sheet material, each angle section having generally flat sides merging into one another at approximately a right angle and having at each end an integral flat triangular end-closing portion, one generally flat side of each angle section forming a portion of one face of the body and the other generally flat side thereof forming a portion of another face of said body, said angle sections being water-tightly joined to one another along the edges of their generally flat sides in such angular relationship that they form a rectangular hollow body, and a four-sided end portion formed from a thermoplastic sheet material closing each end of the body, each of said four-sided end portions being water-tightly joined to the free edges of said triangular end portions.

4. A body as defined in claim 3 wherein the edges of the sides of said angle sections and of the sides of said four-sided end portions are provided with integral flange portions at right angles to said sides and wherein the longitudinal extending flange portions on the edges of the sides of adjacent angle sections are clamped together water-tightly and the flange portions on the free edges of said triangular end-closing portions are clamped water-tightly to cooperating flange portions on the sides of said four-sided end portions.

5. A method of making a hollow mobile body which comprises assembling a plurality of open angle sections formed from a thermoplastic sheet material, each of said sections having a length equal to that of said body, having generally flat sides merging integrally at an angle and having at each end thereof an integral flat triangular end-closing portion, by water-tightly joining said sections to one another in parallel relationship along the edges of their generally flat sides in such angular relationship that they form a hollow body having a polygonal cross section, and closing each end of the resulting hollow body with a polygonal end portion formed from a thermoplastic sheet material having substantially the configuration of the polygonal openings in the ends of said hollow structure by water-tightly joining each of the sides of said polygonal end portions to the free edges of said triangular end-closing portions.

6. A structure formed from a plurality of open elongated angle sections, each of said sections being formed from a thermoplastic sheet material, having generally flat sides merging into one another at an angle, and having at each end an integral flat triangular end-closing portion, said angle sections being water-tightly joined to one another in parallel relationship along the edges of their generally flat sides in such angular relationship that they form a hollow body having a polygonal cross section.

7. A structure as defined in claim 6 wherein the edges of the sides of said angle sections are provided with integral flange portions at an angle to said sides and wherein the flange portions on the edges of the sides of adjacent angle sections are clamped together so as to form a water-tight joint therebetween.

8. A method of making a hollow mobile body which comprises forming a plurality of open angle sections from a thermoplastic sheet material in a drawing operation, each of said sections having a length equal to that of said body, having generally flat sides merging integrally at an angle and having at each end thereof an integral flat triangular end-closing portion, assembling a plurality of said sections into a hollow structure by water-tightly joining said sections to one another in parallel relationship along the edges of their generally flat sides in such angular relationship that they form a hollow body having a polygonal cross section, and closing each end of the resulting hollow body with a preformed polygonal end portion formed from a thermoplastic sheet material having substantially the configuration of the polygonal openings in the ends of said hollow structure by water-tightly joining each of the sides of said polygonal end portions to the free edges of said triangular end-closing portions.

9. An improved mobile trailer of the type having a rigid frame and a plurality of wheels rotatably mounted on said frame comprising:
 four quarter section members, each of said quarter section members having a pair of integral longitudinal walls disposed in generally perpendicular relationship to one another, each quarter section further having at the opposite ends thereof a pair of triangular end walls each integral with and disposed in generally perpendicular relationship to both of said longitudinal walls;
 means for securing each of said quarter section members to an adjacent one of said quarter section members with said quarter section members disposed in such angular relationship to each other that two of said quarter section members together form the upper portion of the trailer body and the other two of said quarter section members together form the lower portion of the trailer body, the uppermost longitudinal walls of the first-mentioned two quarter section members together forming the roof of the trailer body, the lowermost longitudinal walls of the second-mentioned two quarter section members together forming the floor of the trailer body, and the upright longitudinal walls of the two quarter section members on each side together forming a side wall of said trailer body;
 means for securing said second-mentioned quarter section members to said frame with said floor-forming walls overlying said frame; and a pair of four-sided end panels, each of said four-sided end panels being secured to the free edges of said end walls, for defining a substantially enclosed rectangular trailer body with a substantially rectangular internal chamber.

10. A trailer as recited in claim 9, in which each of said quarter section members further comprises:

an outwardly directed flange along each side edge of each of said quarter section members integral therewith, each of said side edge flanges having a plurality of spaced bolt holes extending therethrough; and an outwardly directed flange along each end edge of said quarter section members integral therewith, each of said end edge flanges having a plurality of spaced bolt holes extending therethrough; and in which each edge of said end panels has an outwardly directed flange, each of said flanges having a plurality of bolt holes extending therethrough;

bolt means passing through said flanges on the side edges of adjacent quarter section members for clamping them together; and bolt means passing through said flanges on the end edges of said quarter section members and said flanges on the edges of said end panels for clamping them together.

11. A trailer as recited in claim 10, in which said means for securing one of said quarter section members to an adjacent one of said quarter section members comprising:

a T-shaped member interposed between each of said flanges along a side edge of said one of said quarter section members and a corresponding flange along a side edge of said adjacent one of said quarter section members, said T-shaped member having a plurality of spaced bolt holes extending therethrough;

each of said first-named bolt means passing through a flange along a side edge of said one of said quarter section members, a bolt hole in one of said T-shaped members, and a corresponding flange along a side edge of said adjacent one of said quarter section members; and an elongated cup-shaped member secured to said T-shaped member and serving to cover the joint and protect said bolt means.

12. A trailer as recited in claim 9, in which said quarter section members and said four-sided end panels are formed from laminated thermoplastic material comprising a cellular ABS core and non-cellular facing sheets on each side thereof.

13. An improved mobile trailer of the type having a rigid frame and a plurality of wheels rotatably mounted on said frame comprising:

a pair of quarter section members, each of said quarter section members having a pair of integral longitudinal walls disposed in generally perpendicular relationship to one another, each quarter section further having at the opposite ends thereof a pair of triangular end walls each integral with and disposed in generally perpendicular relationship to both of said longitudinal walls;

a half section member having opposite, rectangular shaped side walls and opposite, rectangular shaped end walls;

means for securing one of said quarter section members to the other of said quarter section members with said quarter section members disposed in such angular relationship to each other that together they form the upper portion of the trailer body and that the uppermost longitudinal walls of said quarter section members together form the roof of the trailer body;

means for securing the lower edges of each of said quarter section members to said half section members with said members in such angular relationship to one another that the side walls of said half section member and the upright longitudinal walls of said quarter section members together form the side walls of said trailer body;

means for securing said half section member to said frame; and a pair of triangular shaped end panels, each of said end panels being secured to the free edges of said triangular end walls of said quarter section members and to the free end edges of said rectangular end walls of said half section member.

14. A trailer as recited in claim 13, in which each of said quarter section members further comprises:

an outwardly directed flange along each side edge of each of said quarter section members integral therewith, each of said side edge flanges having a plurality of bolt holes extending therethrough; and an outwardly directed flange along each end edge of each of said quarter section members integral therewith, each of said end edge flanges having a plurality of bolt holes extending therethrough; and in which each edge of said end panels has an outwardly directed flange, each of said flanges having a plurality of bolt holes extending therethrough;

bolt means passing through said flanges on the side edges of adjacent quarter section members for clamping them together; and bolt means passing through said flanges on the end edges of said quarter section members and said flanges on the edges of said end panels for clamping them together.

15. A trailer as recited in claim 14, in which said means for securing one of said quarter section members to an adjacent one of said quarter section members comprises:

a T-shaped member interposed between each of said flanges along a side edge of one of said quarter section members and a corresponding flange along a side edge of said adjacent one of said quarter section members, said T-shaped member having a plurality of spaced bolt holes extending therethrough;

each of said first-named bolt means passing through a flange along a side edge of said one of said quarter section members, a bolt hole in one of said T-shaped members, and a corresponding flange along a side edge of said adjacent one of said quarter section members; and an elongated cup-shaped member secured to said T-shaped member and serving to cover the joint and protect said bolt means.

16. A trailer as recited in claim 15, in which said means for securing each of said quarter section members to said half-section member comprises:

an L-shaped member interposed between each of said flanges along a side edge of one of said quarter section members and a corresponding side edge of said half section member, said L-shaped member having a plurality of spaced bolt holes extending therethrough;

fastening means passing through said flanges of each of said quarter section members and said L-shaped member into engagement with the side edges of said half section member; and elongated means secured to said L-shaped member for covering the joint and protecting said fastening means.

17. A trailer as recited in claim 13, in which said quarter section members and said triangular shaped end panels are formed from a laminated thermoplastic material comprising a cellular ABS core and non-cellular facing sheets on each side thereof.

18. A trailer as recited in claim 13, in which said half section member is formed from a laminated thermoplastic material comprising a cellular ABS core and non-cellular facing sheets on each side thereof.

* * * * *